(12) United States Patent
Kowald et al.

(10) Patent No.: US 9,815,154 B2
(45) Date of Patent: Nov. 14, 2017

(54) FURNACE HEADER BOX HAVING BLOCKED CONDENSATION PROTECTION, A FURNACE INCLUDING THE HEADER BOX AND A BLOCKED CONDENSATION PROTECTION SYSTEM

(71) Applicant: Lennox Industries Inc., Richardson, TX (US)

(72) Inventors: Glenn W. Kowald, Carrollton, TX (US); Hans J. Paller, Double Oak, TX (US)

(73) Assignee: Lennox Industries Inc., Richardson, TX (US)

( * ) Notice: Subject to any disclaimer, the term of this patent is extended or adjusted under 35 U.S.C. 154(b) by 9 days.

(21) Appl. No.: 15/193,631

(22) Filed: Jun. 27, 2016

(65) Prior Publication Data

US 2016/0305689 A1 Oct. 20, 2016

Related U.S. Application Data (62) Division of application No. 12/834,391, filed on Jul. 12, 2010, now Pat. No. 9,429,338.

(Continued)

(51) Int. Cl.
*F28D 15/00* (2006.01)
*B23P 15/00* (2006.01)
(Continued)

(52) U.S. Cl.
CPC .............. *B23P 15/00* (2013.01); *B29C 45/18* (2013.01); *F23D 14/34* (2013.01); *F23D 14/58* (2013.01);
(Continued)

(58) Field of Classification Search
CPC ........................................................ F24H 8/006
(Continued)

(56) References Cited

U.S. PATENT DOCUMENTS 2,079,807 A    5/1937    Kehl
2,631,659 A    3/1953    Wright
(Continued)

FOREIGN PATENT DOCUMENTS

CN    1729371 A    2/2006
CN    1849495 A    10/2006
(Continued)

OTHER PUBLICATIONS

U.S. Appl. No. 15/091,956, Kowald et al.
(Continued)

*Primary Examiner* — Avinash Savani
*Assistant Examiner* — Aaron Heyamoto
(74) *Attorney, Agent, or Firm* — Winstead PC (57) ABSTRACT

A header box, a furnace and a blocked condensation protection system are disclosed herein. In one embodiment, the header box includes: (1) a first channel having a first channel supply port positioned to be in fluid communication with an inlet of a combustion air blower and a first pressure port couplable to a first input of a pressure sensing device, the combustion air blower and the pressure sensing device associated with the cold end header box and (2) a second channel having a second channel supply port positioned to be in fluid communication with the inlet of the combustion air blower, a second pressure port couplable to a second input of the pressure sensing device and a pressure reference inlet, the second channel in fluid communication with the first channel and configured to have about a same pressure as the first channel when the pressure reference inlet is blocked.

16 Claims, 8 Drawing Sheets

Related U.S. Application Data (60) Provisional application No. 61/295,501, filed on Jan. 15, 2010.

(51) Int. Cl.

| | | |
|---|---|---|
| *F23D 14/58* | (2006.01) | |
| *F23D 14/34* | (2006.01) | |
| *F24H 3/08* | (2006.01) | |
| *F24H 8/00* | (2006.01) | |
| *B29C 45/18* | (2006.01) | |
| *F25D 21/14* | (2006.01) | |
| *F24H 9/20* | (2006.01) | |
| *B29L 31/18* | (2006.01) | |

(52) U.S. Cl.
CPC ............ *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
USPC .............. 126/110 R, 116 A; 165/60, 104.34; 62/150, 285, 288, 291
See application file for complete search history.

(56) References Cited

U.S. PATENT DOCUMENTS

| | | |
|---|---|---|
| 3,274,990 A | 9/1966 | MacCracken |
| 3,806,038 A | 4/1974 | Nelson |
| 4,309,947 A | 1/1982 | Ketterer |
| 4,309,977 A | 1/1982 | Kitchen |
| 4,481,935 A | 11/1984 | Bawel |
| 4,603,680 A | 8/1986 | Dempsey et al. |
| 4,622,947 A | 11/1986 | Hays et al. |
| 4,638,942 A | 1/1987 | Ballard et al. |
| 4,887,767 A | 12/1989 | Thompson et al. |
| 4,976,459 A | 12/1990 | Lynch |
| 4,982,721 A | 1/1991 | Lynch |
| 5,027,789 A | 7/1991 | Lynch |
| 5,123,452 A | 6/1992 | LeBlanc |
| 5,186,386 A | 2/1993 | Lynch |
| 5,197,664 A | 3/1993 | Lynch |
| 5,313,930 A | 5/1994 | Kujawa et al. |
| 5,320,087 A | 6/1994 | Froman |
| 5,322,050 A | 6/1994 | Lu |
| 5,347,980 A | 9/1994 | Shellenberger |
| 5,375,586 A | 12/1994 | Schumacher et al. |
| 5,429,150 A | 7/1995 | Siefers, Jr. |
| 5,448,986 A | 9/1995 | Christopher et al. |
| 5,522,541 A | 6/1996 | Zia et al. |
| 5,582,159 A | 12/1996 | Harvey et al. |
| 5,623,918 A | 4/1997 | Swilik, Jr. et al. |
| 5,642,660 A | 7/1997 | Killgore et al. |
| 5,666,889 A | 9/1997 | Evens et al. |
| 5,704,343 A | 1/1998 | Ahn et al. |
| 5,749,355 A * | 5/1998 | Roan ....................... F24H 3/105 126/110 R |
| 5,775,318 A | 7/1998 | Haydock et al. |
| 5,799,646 A | 9/1998 | Zia et al. |
| 6,237,545 B1 | 5/2001 | Barnett et al. |
| 6,893,252 B2 | 5/2005 | Stephens et al. |
| 7,036,498 B2 | 5/2006 | Riepenhoff et al. |
| 8,056,533 B2 | 11/2011 | Wagner |
| 8,056,553 B2 | 11/2011 | Khan |
| 8,393,318 B2 | 3/2013 | Khan et al. |
| 8,474,281 B2 | 7/2013 | Kumar |
| 8,561,601 B2 | 10/2013 | Schneberger et al. |
| 8,672,673 B2 | 3/2014 | Noman et al. |
| 8,683,993 B2 | 4/2014 | Paller et al. |
| 2003/0188733 A1 | 10/2003 | Woodall et al. |
| 2005/0126558 A1 | 6/2005 | Riepenhoff et al. |
| 2007/0003891 A1 | 1/2007 | Jaeschke |
| 2008/0314375 A1 | 12/2008 | Khan |
| 2009/0044793 A1 | 2/2009 | Khan et al. |
| 2009/0044794 A1 | 2/2009 | Hugghins et al. |
| 2011/0070818 A1 | 3/2011 | Goel et al. |
| 2011/0174201 A1 | 7/2011 | Kowald et al. |
| 2011/0174291 A1 | 7/2011 | Manohar et al. |
| 2011/0174461 A1 | 7/2011 | Kowald et al. |
| 2011/0174471 A1 | 7/2011 | Paller et al. |
| 2011/0174891 A1 | 7/2011 | Kowald et al. |
| 2011/0177465 A1 | 7/2011 | Paller et al. |
| 2012/0055465 A1 | 3/2012 | Khan |
| 2012/0090591 A1 | 4/2012 | Rieke et al. |

FOREIGN PATENT DOCUMENTS

| | | |
|---|---|---|
| CN | 1930441 A | 3/2007 |
| CN | 201203263 Y | 3/2009 |
| EP | 0596555 A1 | 5/1994 |
| FR | 1147639 A | 11/1957 |
| FR | 2581735 A1 | 11/1986 |
| JP | S5620908 A | 2/1981 |
| JP | 2007253206 | 10/2007 |

OTHER PUBLICATIONS

Translation of Chinese office action dated Jul. 7, 2014, Applicant: Lennox Industries Inc., 7 pages.
Foreign Communication From A Related Counterpart Application, Chinese Application No. 201010594963.0, First Chinese Office Action dated Jan. 30, 2014, 6 pages.

* cited by examiner

FURNACE HEADER BOX HAVING BLOCKED CONDENSATION PROTECTION, A FURNACE INCLUDING THE HEADER BOX AND A BLOCKED CONDENSATION PROTECTION SYSTEM

CROSS-REFERENCE TO RELATED APPLICATION

This application is a divisional of U.S. patent application Ser. No. 12/834,391, filed Jul. 12, 2010. U.S. patent application Ser. No. 12/834,391 claims the benefit of U.S. Provisional Application No. 61/295,501, filed by Shailesh S. Manohar, et al., on Jan. 15, 2010, entitled "An Improved Heating Furnace for a HVAC System". U.S. patent application Ser. No. 12/834,391 and U.S. Provisional Application Ser. No. 61/295,501 are incorporated herein by reference.

TECHNICAL FIELD

This application is directed, in general, to furnaces and, more specifically, to protecting the furnace from condensation accumulation.

BACKGROUND

HVAC systems can be used to regulate the environment within an enclosure. Typically, an air blower is used to pull air from the enclosure into the HVAC system through ducts and push the air back into the enclosure through additional ducts after conditioning the air (e.g., heating or cooling the air). For example, a furnace, such as a gas furnace may be used to heat the air.

High efficiency residential gas-fired appliances typically rely on a mechanical means, such as a combustion air inducer, to create controlled mass flow thru the flue side of the appliance heat exchanger. For flow to occur, a pressure differential must exist across the heat train of the furnace. To verify that the proper pressure drop and flow are achieved and maintained to support the combustion process of the furnace within safe limits, pressure sensing devices are typically employed. These pressure sensing devices might include mechanical differential pressure sensing devices (such as pressure switches) or electronic sensors which provide feedback to an integrated electronic control.

This type of furnace design is similar among industry manufacturers, and typically employs a flue gas/condensate collector box attached to the end of the condenser coil (referred to herein as a Cold End Header Box (CEHB)), a combustion air inducer fan assembly (CAI), a fixed orifice located in the CAI or CEHB to regulate flow through the heat train, and a pressure sensing device to monitor flow. The pressure sensing device could be used to monitor pressure across the fixed orifice, or other points in the heat train to provide the most advantageous signal for the application.

SUMMARY

In one aspect, the disclosure provides a CEHB. In one embodiment, the CEHB includes: (1) a first channel having a first channel supply port positioned to be in fluid communication with an inlet of a combustion air blower and a first pressure port couplable to a first input of a pressure sensing device, the combustion air blower and the pressure sensing device associated with the cold end header box and (2) a second channel having a second channel supply port positioned to be in fluid communication with the inlet of the combustion air blower, a second pressure port couplable to a second input of the pressure sensing device and a pressure reference inlet, the second channel in fluid communication with the first channel and configured to have about a same pressure as the first channel when the pressure reference inlet is blocked.

In another aspect, a furnace is disclosed. In one embodiment, the furnace includes: (1) a heat exchanger, (2) a combustion air inducer configured to generate air flow through the heat exchanger, (3) a pressure sensing device configured to monitor a combustion pressure through the heat exchanger and (4) a header box configured to be coupled between the heat exchanger and the combustion air inducer, the header box having: (4A) a negative pressure channel having a first channel supply port positioned to be in fluid communication with an inlet of the combustion air blower and a negative pressure port couplable to a negative input of the pressure sensing device; and (4B) a positive pressure channel having a positive pressure channel supply port positioned to be in fluid communication with the inlet of the combustion air blower, a positive pressure port couplable to a positive input of the pressure sensing device and a pressure reference inlet, the positive pressure channel in fluid communication with the negative pressure channel and configured to have about a same pressure as the negative pressure channel when the pressure reference inlet is blocked.

In yet another aspect, blocked condensation protection system for a furnace is disclosed. In one embodiment, the blocked condensation protection system includes: (1) a pressure sensing device configured to monitor a combustion pressure through a heat exchanger of the furnace and (2) a header box configured to be coupled between the heat exchanger and a combustion air inducer of the furnace, the header box having: (2A) a first channel having a first channel supply port positioned to be in fluid communication with an inlet of a combustion air blower associated with the furnace and a first pressure port couplable to a first input of the pressure sensing device and (2B) a second channel having a second channel supply port positioned to be in fluid communication with the inlet of the combustion air blower, a second pressure port couplable to a second input of the pressure sensing device and a pressure reference inlet, the second channel in fluid communication with the first channel and configured to have about a same pressure as the first channel when the pressure reference inlet is blocked, the pressure sensing device configured to turn off a fuel supply to the heat exchanger when determining a pressure differential between the first channel and the second channel is about zero.

BRIEF DESCRIPTION

Reference is now made to the following descriptions taken in conjunction with the accompanying drawings, in which.

DETAILED DESCRIPTION

As air flows through the heat train of the furnace, condensation is generated and typically collected in the CEHB. To prevent build-up of the condensation and protect the monitoring equipment, for example the pressure sensing devices, proper draining of the condensation out of the CEHB is needed. Conventional furnaces may require multiple pressure sensing devices or require relocating the pressure sensing devices when a furnace is used in different positions in order to properly sense water build-up under block drain conditions and protect the sensing devices from condensation. Additionally, hoses used for drainage or sensing pressure may also have to be relocated when a furnace is installed at different positions.

The disclosure provides a furnace including a header box having integrated blocked condensation protection. Whether the furnace is installed in either an upright or horizontal position, disclosed herein is a blocked condensation protection system that is configured to shut off the fuel to the furnace when the condensate drain, a vent or an air intake is plugged. Instead of the disclosed furnace requiring multiple switches for monitoring combustion pressure (which verifies proper flow through the heat exchanger), as disclosed herein a single pressure sensing device may be used to monitor the combustion pressure and protect against blocked condensation drainage. Unlike conventional furnaces, the disclosed furnace does not need the relocating of switches or the rerouting of any pressure tubes when used in different positions.

In one embodiment, the header box is a CEHB of a gas furnace. The CEHB is disposed between the secondary heat exchanger and the combustion air inducer of the gas furnace. The disclosed CEHB includes channels that are appropriately sized and positioned to fluidly communicate and obtain about the same pressure when condensation drainage is not operating properly (e.g., blocked condensation). As such, a pressure sensing device coupled to pressure ports in the channels detects a zero or about zero differential pressure between the channels and shuts off the fuel supply to the furnace. Due to the configuration of the channels, the disclosure advantageously uses a single pressure sensing device to monitor the combustion pressure and blocked drainage. Advantageously, the number of safety pressure switches that are typically needed can be reduced.

Figure 1:
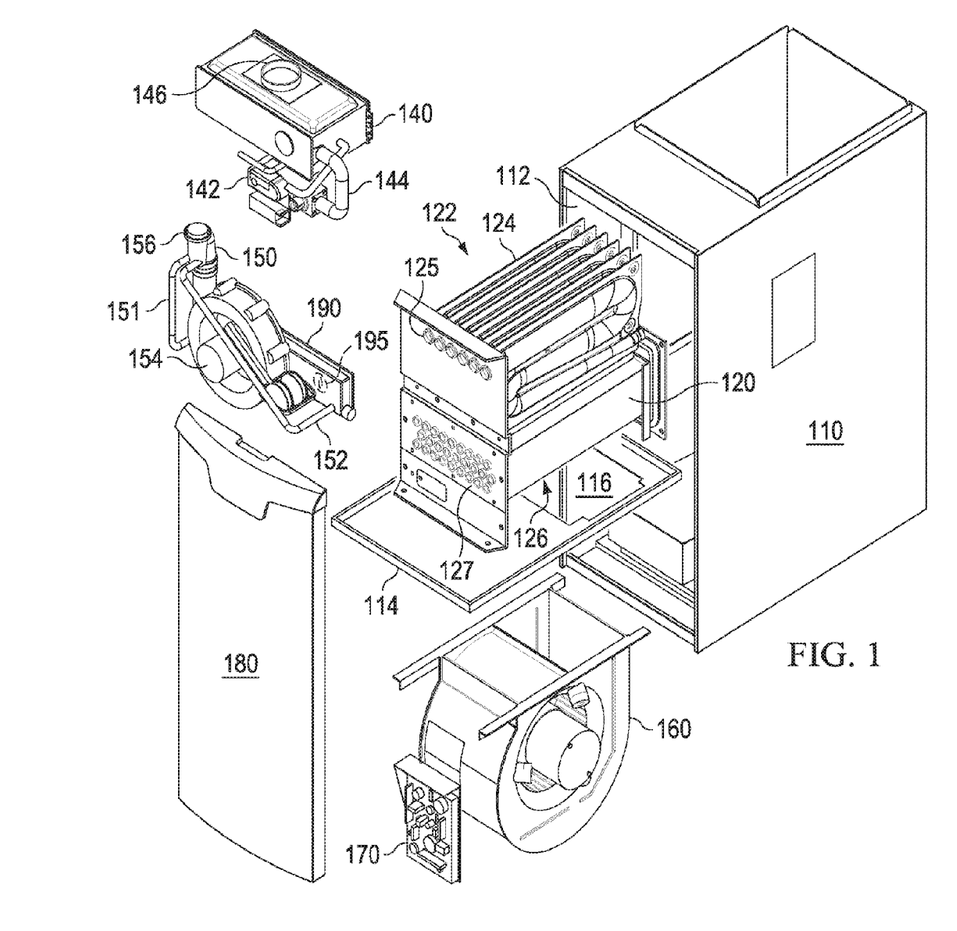
FIG. 1 is an exploded isometric view of a portion of an embodiment of a furnace constructed according to the principles of the disclosure.

Turning now to FIG. 1, illustrated is an exploded isometric view of a portion of an embodiment of a furnace 100 constructed according to the principles of the disclosure. The furnace 100 may be a multi-position furnace. In some embodiments, the furnace may be a residential gas furnace. The furnace 100 includes an embodiment of a header box having blocked condensation protection integrated therein. The furnace 100 includes a housing 110 having a front opening 112 within which a mounting shelf 114 is located. The mounting shelf 114 has an opening 116 therein and supports a heat exchanger assembly 120 over the opening 116. The heat exchanger assembly 120 includes a primary heat exchanger 122 and a secondary heat exchanger 126. The primary heat exchanger 122 includes a row of six heat exchangers (one referenced as 124) coupled to one another. The heat exchangers are generally serpentine and have three approximately 180 .degree. folds such that the heat exchangers cross over the opening 116 four times, terminating in inlets 125 (of the primary heat exchanger 122) and outlets 127 (of the secondary heat exchanger 126) that are generally mutually coplanar and oriented toward the opening 112 of the housing 110. Alternative embodiments of the heat exchanger assembly 120 may have more or fewer heat exchangers coupled to one another in one or more rows. Additionally, alternative embodiments may have alternative heat exchanger configurations.

A burner assembly 140 contains a thermostatically-controlled solenoid valve 142, a manifold 144 leading from the valve 142 and across the burner assembly 140, one or more gas orifices (not shown) coupled to the manifold 144 and one or more burners (not shown) corresponding to and located proximate the gas orifices. The illustrated embodiment of the burner assembly 140 has a row of six burners. Alternative embodiments of the burner assembly 140 may have more or fewer burners arranged in one or more rows. A combustion air inlet 146 allows air in for the burner assembly 140. In an assembled configuration, the burner assembly 140 is located proximate the heat exchanger assembly 120 such that the burners thereof at least approximately align with the inlets 125.

The furnace 100 also includes a draft inducer assembly 150 having a combustion air inducer 154 and a combustion flue collar 156 coupled to an outlet of the combustion air inducer 154. In an assembled configuration, the draft inducer assembly 150 is located proximate the heat exchanger assembly 120 such that the combustion flue collar 156 approximately aligns with a flue (not illustrated) that directs undesired gases (e.g., gaseous products of combustion) away from the furnace 100. Associated with the draft inducer assembly 150 are first and second drain hoses, 151, 152, that provide a path to drain condensation from the combustion flue collar 156 and the flue.

A blower 160 is suspended from the shelf 114 such that an outlet (not referenced) thereof approximately aligns with the opening 116. An electronic controller 170 is located proximate the blower 160 and is configured to control the blower, the valve 142 and the combustion air inducer 154 to cause the furnace to provide heat. A cover 180 may be placed over the front opening 112 of the housing 110.

A CEHB 190 provides an interface between the combustion air inducer 154 and the secondary heat exchanger 126. The combustion air inducer 154 has an inlet coupled to the CEHB 190. In an assembled configuration, the draft inducer assembly 150 is located proximate the heat exchanger assembly 120 such that the CEHB 190 approximately aligns with the outlets 127 and the combustion flue collar 156 approximately aligns with the flue.

The furnace 100 also includes a pressure sensing device 195 that is configured to monitor the combustion pressure through the heat train of the furnace 100. The pressure sensing device 195 may be a mechanical differential pressure sensing device (such as a pressure switch) or an electronic sensor which provide feedback to an integrated electronic controller of the furnace 100, such as the electronic controller 170. The pressure sensing device 195 includes inputs for determining the combustion pressure. The inputs of the pressure sensing device 195 are coupled to pressure ports of the CEHB 190. As discussed below, the pressure ports are protected from water contamination by placement of the pressure ports in channels of the CEHB 190.

Based on a differential pressure obtained by the pressure sensing device 195 from data received via the pressure ports, the gas supply for the heat exchanger 120 may be turned-off or remain off when there is improper air flow through the heat train. Additionally, the gas supply for the heat exchanger 120 may be turned-off or remain off when condensation drainage of the CEHB 190 is impaired or blocked. Thus, the same pressure sensing device 195 employing data from the pressure ports of the CEHB 195 may protect the furnace 100 from improper air flow through the heat train and protect the furnace 100 from blocked condensation drainage. The pressure sensing device 195 may be fastened to the ports of the CEHB 190 through conventional hoses. The pressure sensing device 195 may also be coupled to the electronic controller 170 or the valve 142 through conventional means. In some embodiments, the pressure sensing device 195 may be fastened to the CEHB 190.

In the illustrated embodiment, the controller 170 turns on the combustion air inducer 154 to initiate a draft in the heat exchangers (including the heat exchanger 124) and purge potentially harmful unburned or combustion gases. Then the controller 170 opens the valve 142 to admit gas to the manifold 144 and the one or more gas orifices, whereupon the gas begins to mix with air to form primary combustion air. Then the controller 170 activates an igniter (not shown in FIG. 1) to attempt to ignite the primary combustion air. If the output of a flame rectification circuit indicates that the primary combustion air has not ignited within a predetermined period of time, the controller 170 then closes the valve 142 and waits until attempting to start again. If the output of a flame rectification circuit indicates that the primary combustion air has ignited within the predetermined period of time, the controller 170 then activates the blower 160, which forces air upward through the opening 116 and the heat exchanger assembly 120. As it passes over the surfaces of the heat exchangers, the air is warmed, whereupon it may be delivered or distributed as needed to provide heating.

Figure 2:
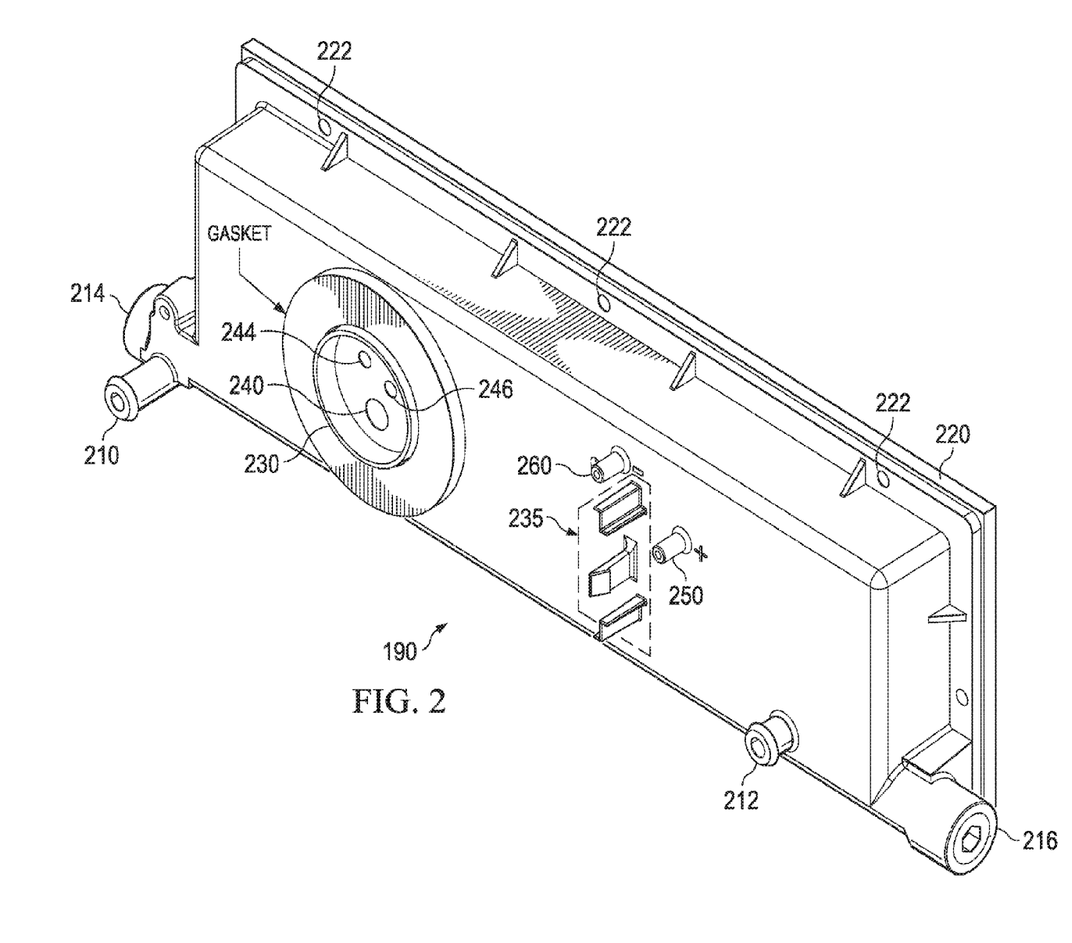
FIG. 2 is a front isometric view of an embodiment of a CEHB constructed according to the principles of the disclosure.

FIG. 2 is a front isometric view of an embodiment of a CEHB, such as the CEHB 190, constructed according to the principles of the disclosure. As noted above, the CEHB 190 is configured to provide an interface between the secondary heat exchanger 126 and the combustion air inducer 154 that draws combustion air through the heat exchanger 120.

The CEHB 190 is configured to provide an exit for the heated gas from the heat exchanger via the secondary heat exchanger 126. The CEHB 190 is also configured to remove the condensation associated with the heated gas. As such, the CEHB 190 is typically constructed of a non-metallic material that is resistive to water corrosion. The CEHB 190, for example, may be constructed of a plastic.

The CEHB 190 may be employed in a multi-position gas furnace such as the furnace 100. Accordingly, the CEHB 190 includes components of a multi-position drain system that includes a first drain port 210, a second drain port 212, a left drain 214 and a right drain 216. The first and second drain ports 210, 212, are positioned and configured to couple to drain hoses, such as drain hoses 151, 152, from the combustion flue collar 156. Depending on the installation of the furnace 100, the left drain 214, the right drain 216 or both the left and right drains 214, 216, may be used to remove condensation from the CEHB 190.

Located on the four sides of the CEHB 190 is a flange 220 that is configured to attach the CEHB 190 to the secondary heat exchanger 126. The flange 220 includes holes, in which hole 222 is denoted, that are used to mechanically attach the CEHB 190 to the secondary heat exchanger 126. A gasket is typically used between the flange 220 and the secondary heat exchanger 126.

The CEHB 190 also includes a support collar 230 that is used to couple the combustion air inducer 154 to the CEHB 190. The support collar 230, therefore, corresponds to an inlet of the combustion air blower 154 for drawing air through the heat exchanger 120. The support collar 230 helps support the combustion air inducer in such a way that the inducer requires only two screws compared to the traditional four to mount to the CEHB 190. A gasket denoted in FIG. 1 is typically used with the support collar 230 for coupling the CEHB 190 to the combustion air blower 154.

Located within the circumference of the support collar 230 (and therefore within the inlet of the combustion air blower 154) is a fixed orifice 240. The fixed orifice 240 is configured to regulate gas flow through the heat exchanger 120. The fixed orifice 240 may be sized based on an input size of the furnace 100. Also located within the circumference of the support collar 230 are a negative channel supply port 244 and a positive channel supply port 246. Each of these ports in the front face of the CEHB 190 provides an opening for supplying air to the respective channels. The size and location of the fixed orifice 240, the negative channel supply port 244, the positive channel supply port 246 and the size and location of positive and negative pressure channels 270, 280, (illustrated in FIG. 3) may be determined through empirical testing to provide a target pressure or pressure range as detected by a pressure sensing device for determining combustion pressure. The advantage of such an arrangement is that a common pressure switch, such as the pressure sensing device 195, can be used for various input sizes of furnaces as well as provide a pressure signal that is suitable to a gas-air amplified gas valve to allow input rate modulation.

The CEHB 190 also includes a connection system 235 having alignment protrusions as denoted in FIG. 2 that are used to couple the pressure sensing device 195 to the CEHB 190. The connection system 235 and the corresponding protrusions may vary depending on the type or model of the pressure sensing device 195 to be attached to the CEHB 190.

Figure 3:
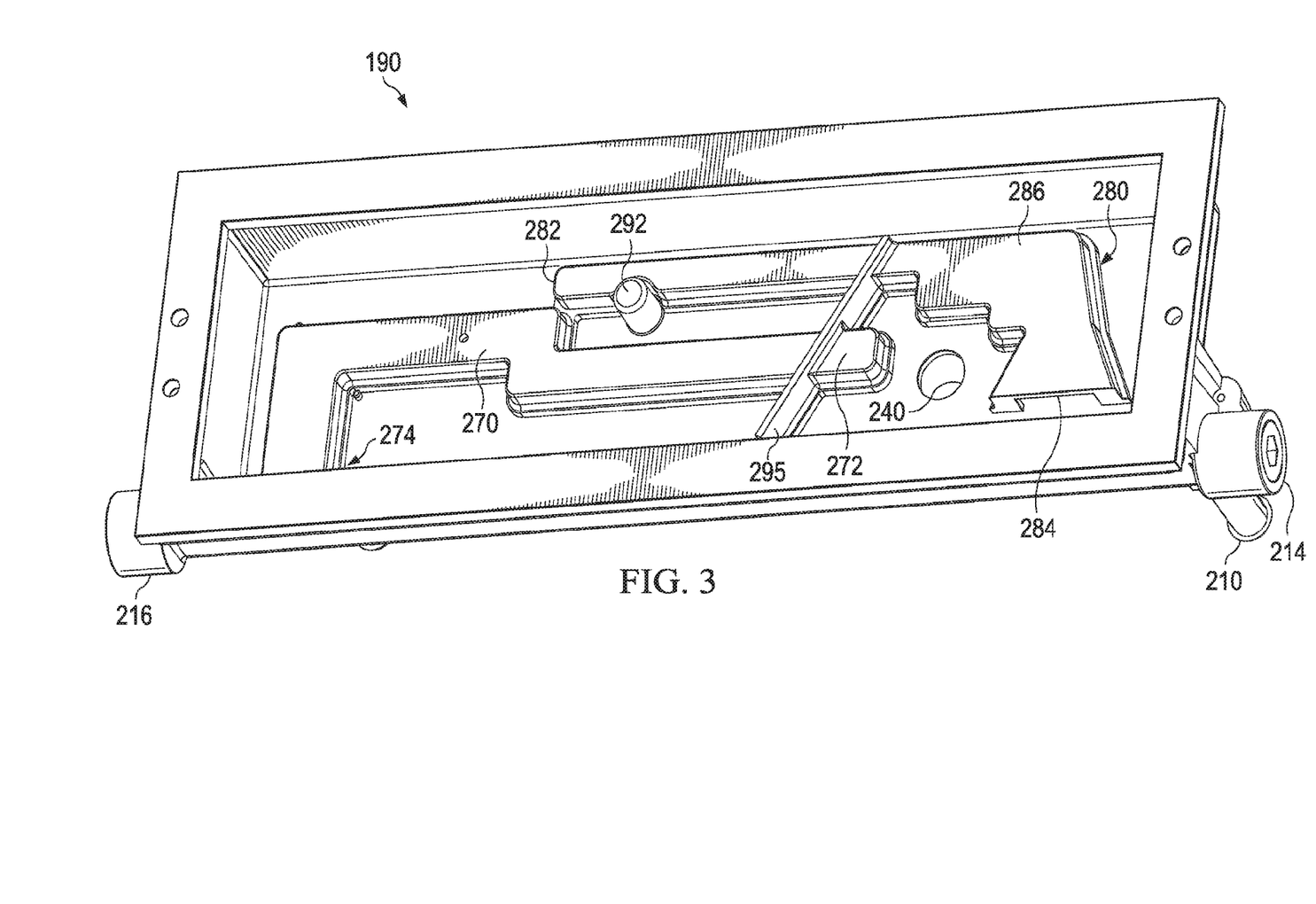
FIG. 3 is a rear isometric view of the CEHB of FIG. 2.

The CEHB 190 further includes a positive pressure port 250 and a negative pressure port 260 that are coupled to a positive input and a negative input of a pressure sensing device, such as the pressure sensing device 195. The pressure sensing device is configured to monitor a combustion pressure across the fixed orifice 240 based on data received at the negative input port and the positive input port via the negative and positive pressure ports 250, 260. The positive and negative pressure ports 250, 260, are typically coupled to the pressure sensing device via pressure sensing device hoses. The positive pressure port 250 is located within the positive pressure channel 270 and the negative pressure port 260 is located within the negative pressure channel 280 as illustrated in FIG. 3. Locating the positive pressure port 250 and the negative pressure port 260 within the respective channels and away from openings of the respective channels protects the pressure ports and the pressure sensing device from condensation.

The CEHB 190 further includes a screw mounting lug 292 and a water dam 295. The screw mounting lug 292 is used when mounting a combustion air inducer to the CEHB 190. The water dam 295 is a condensate water dam that is configured to direct water away from sensitive areas of the CEHB 190 and assists in maintaining a stable pressure signal.

FIG. 3 is a rear isometric view of the CEHB 190 that illustrates the positive pressure channel 270 and the negative pressure channel 280. Though not visible in FIG. 3, the positive pressure channel 270 includes the positive pressure port 250. During normal operation, the positive pressure channel 270 has the same or about the same pressure as the CEHB 190 (i.e., within the main cavity of the CEHB 190). As such, locating the positive pressure port 250 within the positive pressure channel 270 allows measuring of the combustion pressure while protecting the positive pressure port 250 from condensation. Other components of the positive pressure channel 270 and the negative pressure channel 280 that are not visible in FIG. 3 (or FIG. 2) include the negative channel supply port 244, the positive channel supply port 246 and a flow restriction orifice located within the positive pressure channel 270. Additionally, the negative pressure channel 280 includes bleed ports that are not visible in FIG. 2 or FIG. 3. The bleed ports are configured to reduce the pressure received through the negative channel supply port 244 to a targeted range when measured at the negative pressure port 260. The bleed ports are denoted in FIG. 4. A size, configuration and location of the channels 270, 280, and the various components thereof may be determined through empirical testing to provide a target pressure or pressure range when detected by a pressure sensing device to correlate to a targeted pressure drop or flow thru the heat exchanger.

Figure 4:
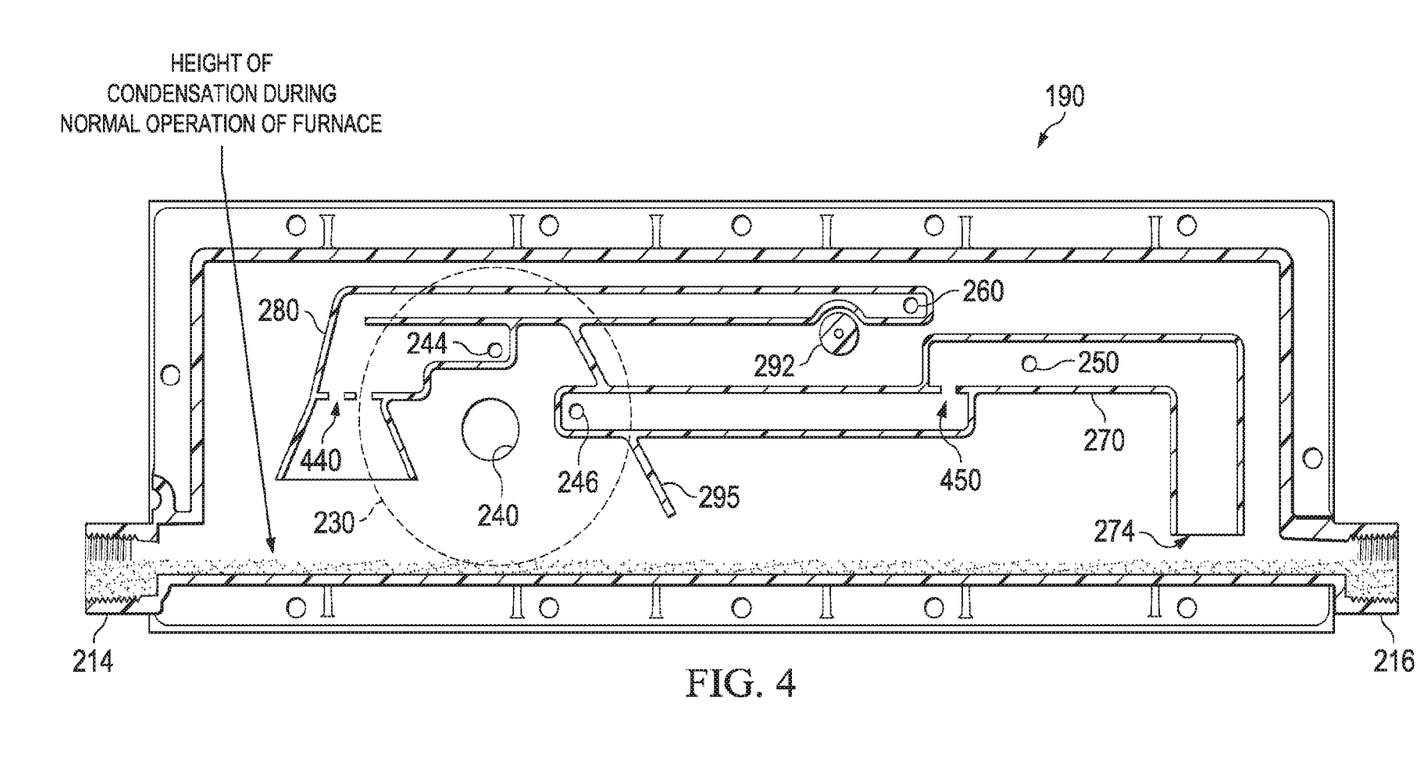
FIG. 4 is a functional view of an embodiment of a CEHB constructed according to the principles of the disclosure showing normal operation when the CEHB is in a horizontal position.

A first end of the positive pressure channel 270, an inlet end 272, extends within the support collar 230 as illustrated within FIG. 4. A second end of the positive pressure channel 270, a pressure reference inlet 274, opens toward the side of the CEHB 190 having the first and second drains 214, 216. The pressure reference inlet 274 is located such that the collection of an undesired level of condensate within the CEHB 190 will cause the pressure within the positive pressure channel 270 to change. The monitoring of this change by the pressure sensing device 195 will allow the furnace to be shut down safely in response to the change. The positive pressure channel 270 has a quadrilateral cross section and includes four sections that are joined at or about 90 degrees to form a continuous open channel from the inlet end 272 to the pressure reference inlet 274.

Though not visible in FIG. 3, the negative pressure channel 280 includes the negative pressure port 260. The negative pressure channel 280 is configured to reduce the high negative pressure that is present at the inlet of the combustion air inducer 154 to a targeted pressure or pressure range at the negative pressure port 260. As such, locating the negative pressure port 260 within the negative pressure channel 280 allows measuring of the combustion pressure signal while protecting the negative pressure port 260 from condensation. The negative pressure channel 280 includes a first end denoted as a closed end 282. A second end of the negative pressure channel 280, an open end 284, opens toward the side of the CEHB 190 having the first and second drains 214, 216. The open end 284 is located such that the collection of an undesired level of condensate within the CEHB 190 will cause the pressure within the negative pressure channel 280 to change. The monitoring of this change by the pressure sensing device 195 will allow the furnace to be shut down safely in response to the change. The negative pressure channel 280 has a quadrilateral cross section and includes four sections that are joined to form a continuous open channel from the closed end 282 to the open end 284.

Located within a supply section 286 of the negative pressure channel 280 is the negative channel supply port 244. A portion of the supply section 286 including the negative channel supply port 244 is located within the circumference of the support collar 230 and, therefore, the corresponding inlet of the combustion air inducer 154. Sides of the negative pressure channel 280 around the open end 284 are shaped to provide a water shroud to protect the negative pressure port 260 from contamination.

The negative channel supply port 244 is positioned to be in fluid communication with the inlet of the combustion air inducer. The negative pressure port 260 in the negative pressure channel 280 is couplable to an input, such as a negative input, of a pressure sensor device. Similarly, the positive pressure channel supply port 246 is positioned to be in fluid communication with the inlet of the combustion air blower and the positive pressure port 250 is couplable to an input, such as a positive input, of the pressure sensor device. The positive pressure channel 270 and the negative pressure channel 280 are in fluid communication and are configured to have about a same pressure when the pressure reference inlet 274 is blocked (e.g., blocked by condensation). The CEHB 190 is designed wherein this is true even when the furnace including the CEHB 190 is installed in multiple positions. During operation of the combustion air blower when the pressure reference inlet 274 is not blocked (i.e., during normal operation when there is proper drainage), the positive pressure channel 270 is configured to have a positive pressure compared to negative pressure channel 280.

FIG. 4 is a functional view of an embodiment of a CEHB, the CEHB 190, constructed according to the principles of the disclosure showing normal operation when the CEHB 190 is in a horizontal position (i.e., a furnace including the CEHB 190 is installed in the upflow position. FIG. 4 provides a cutaway of the CEHB 190 to more clearly illustrate the operation of the positive and negative channels 270, 280, within the inlet of the combustion air inducer 154. Illustrated in FIG. 4 in addition to the previously noted components of the CEHB 190 are bleed ports 440 of the negative pressure channel 280 and a flow restriction orifice 450 of the positive pressure channel 270.

The bleed ports 440 are designed to bleed down the negative pressure that is received via the negative pressure channel supply port 244. The bleed ports 440 are positioned in the CEHB 190 to be free from water contamination. The location and size of the bleed ports are selected to normalize the high negative pressure in the inlet zone of the combustion air inducer 154 to a targeted pressure value or range of values at the negative pressure port 260. As such, a single type of pressure sensing device can be used for various models.

The flow restriction orifice 450 is configured to restrict air flow through the positive pressure channel 270 from the positive pressure channel supply port 246. The size of the flow restriction orifice 450 may be selected to coordinate with the positive pressure port 250.

During normal operation, condensation gathers on the lower side of the CEHB 190, which is connected to both the left drain 214 and the right drain 216 when the CEHB 190 is horizontal. Both the left drain 214 and the right drain 216 can provide a drainage path for the condensation. In some embodiments, only one of the drains 214, 216, may be used while the unused drain is intentionally plugged.

While a clear drainage path is provided for the condensation to drain out, the pressure reference inlet 274 is unblocked by condensation and the pressure in the positive pressure channel 270 represents the pressure in the CHEB 190. As such, a pressure differential that exists between the negative pressure channel 280 and the positive pressure channel 270 is maintained.

Figure 5:
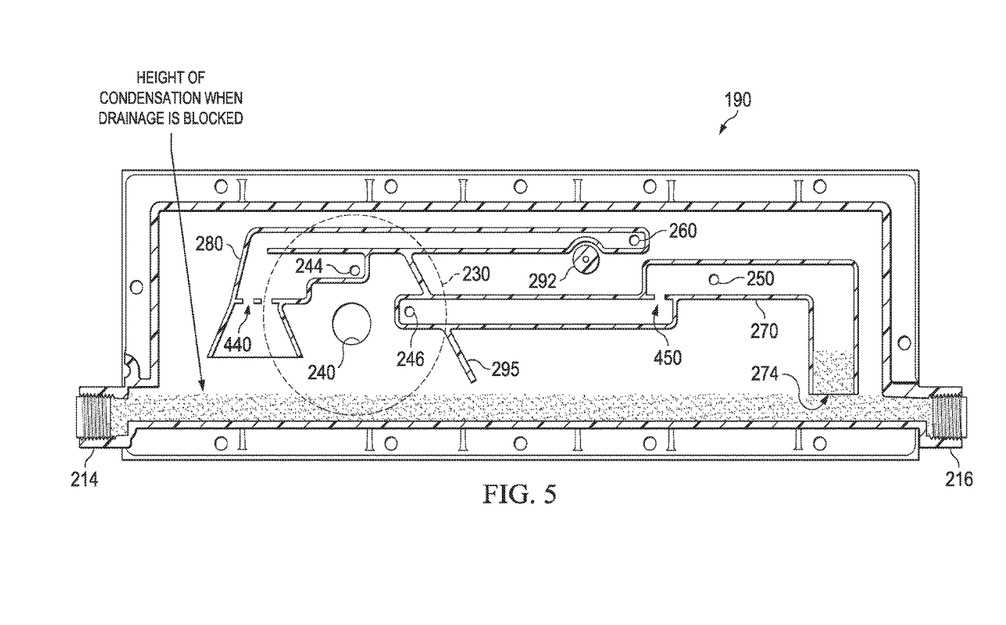
FIG. 5 is a functional view of the CEHB in FIG. 4 illustrating a blocked drainage path.

When the condensation does not drain from the CEHB 190, the condensation backs-up and blocks the pressure reference inlet 274 as illustrated in FIG. 5. Pressure in the positive pressure channel 270, therefore, becomes more negative based on the input from the positive pressure supply port 430. As such, the differential pressure between the positive pressure channel 270 and the negative pressure channel 280 is driven to zero or about zero. In response, a pressure sensing device, such as the pressure sensing device 195, that is coupled to the negative and positive supply ports 260, 250, can initiate turning off the gas to the burners of the heat exchanger 120.

Figure 6:
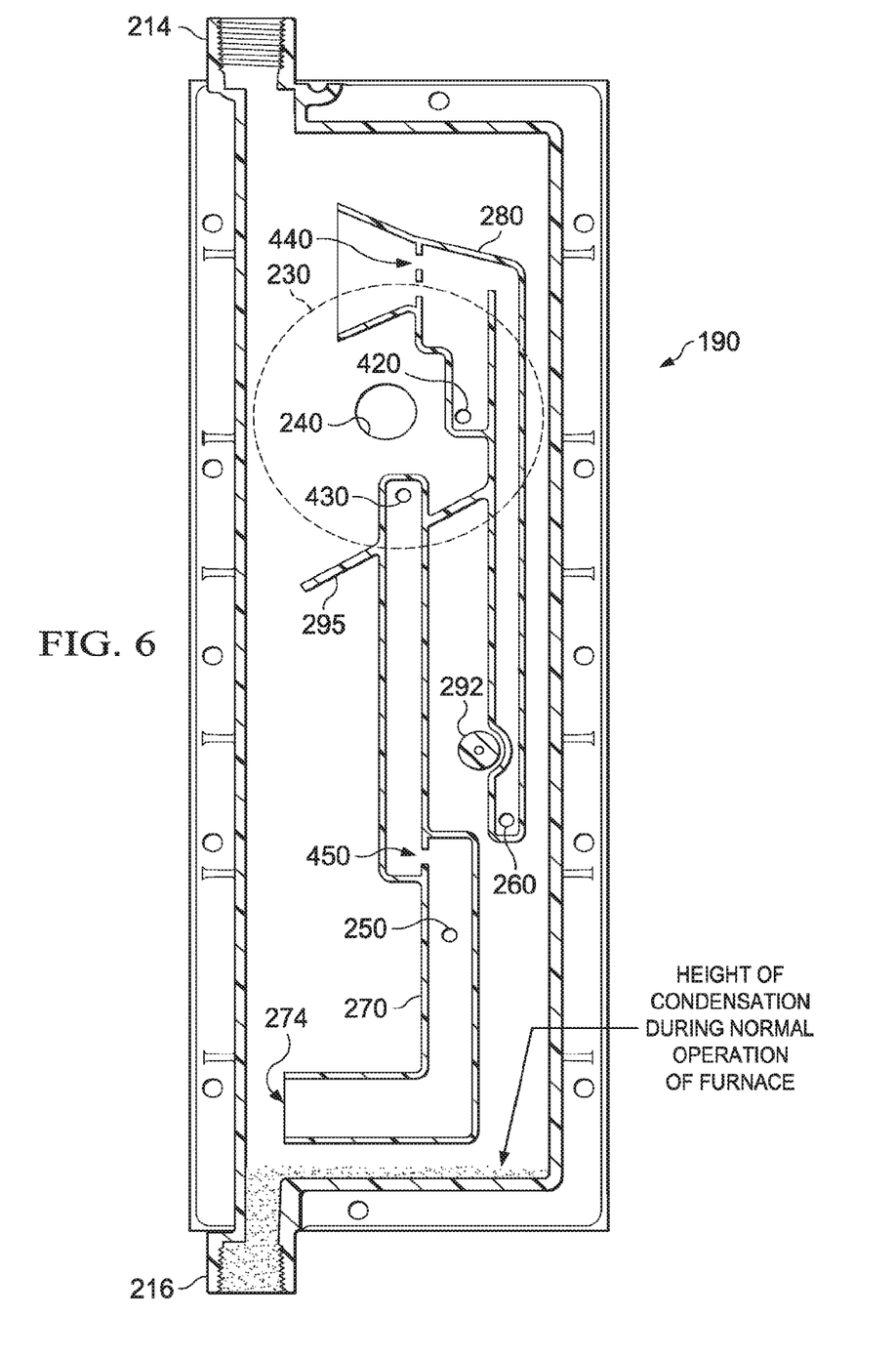
FIG. 6 is a functional view of an embodiment of a CEHB constructed according to the principles of the disclosure showing normal operation when the CEHB is in an upright position.
Figure 7:
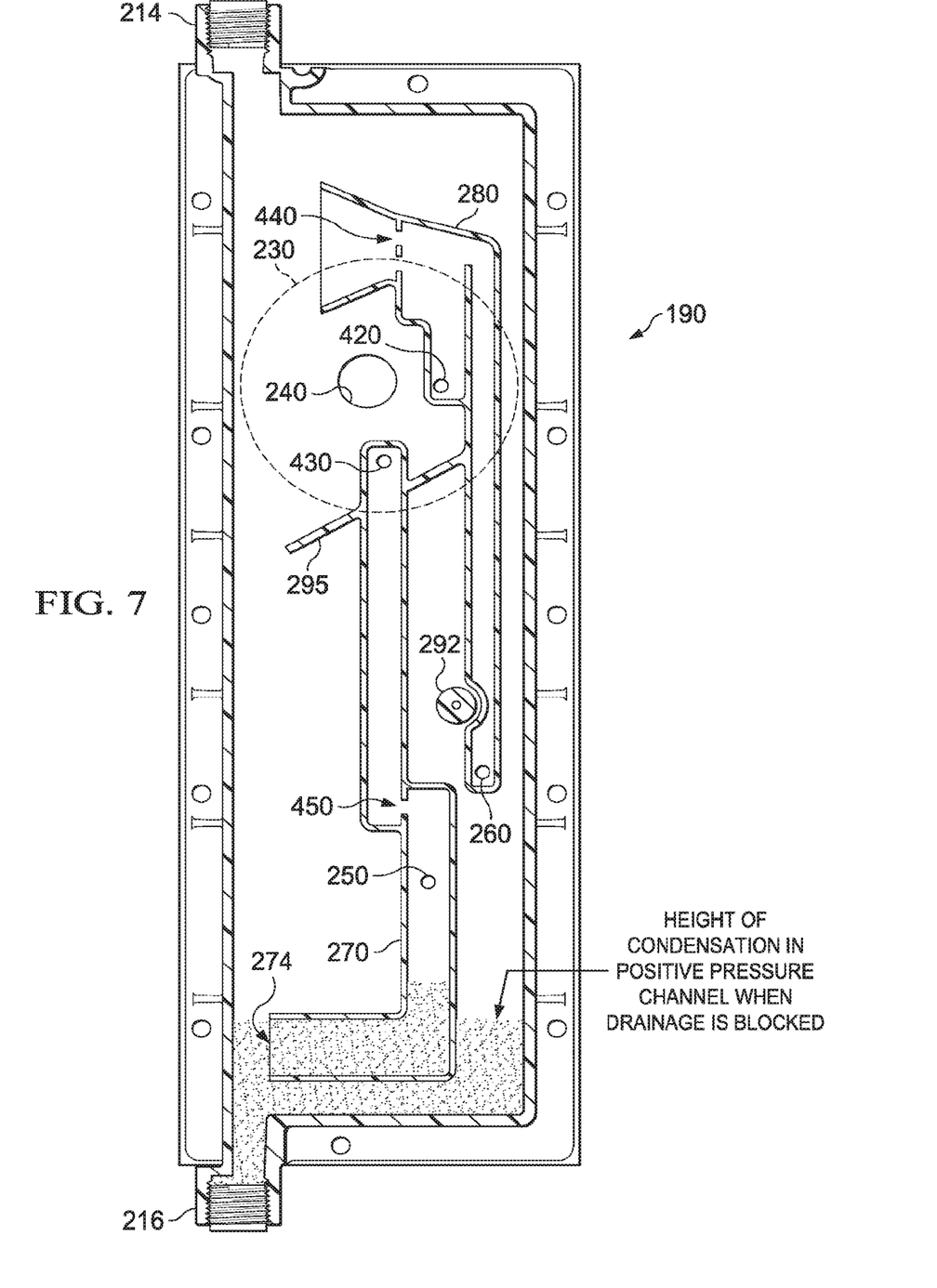
FIG. 7 is a functional view of the CEHB of FIG. 6 illustrating a blocked drainage path.

A similar operation is illustrated in FIG. 6 and FIG. 7 wherein the CEHB 190 is in an upright position (i.e., the furnace with the CEHB 190 is in a horizontal left or a horizontal right position). As noted in FIG. 6 and FIG. 7, the lower side is now the side proximate the pressure reference inlet 274 that is coupled to a single drain (i.e., the right drain 216.) FIG. 6 represents proper drainage while FIG. 7 illustrates blocked condensation drainage.

Figure 8:
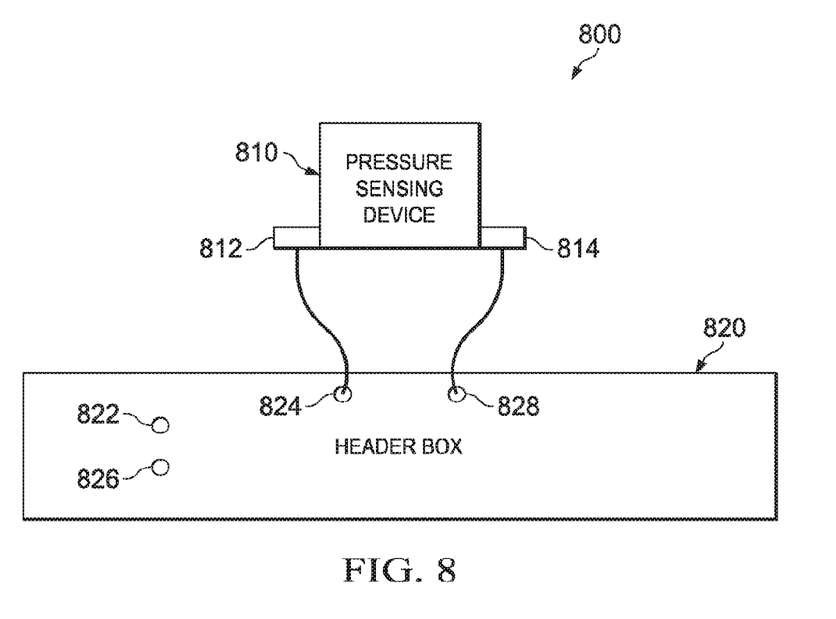
FIG. 8 is a block diagram of an embodiment of a blocked condensation protection system constructed according to the principles of the disclosure.

FIG. 8 is a block diagram of an embodiment of a blocked condensation protection system 800 constructed according to the principles of the disclosure. The blocked condensation protection system 800 includes a pressure sensing device 810 and a header box 820. The blocked condensation protection system 800 is configured to be used in a furnace such as the furnace 100 of FIG. 1. The pressure sensing device 810 is configured to monitor a combustion pressure through a heat exchanger of a furnace. The pressure sensing device 810 may be a mechanical differential pressure sensing device, such as pressure switch. Alternatively, the pressure sensing device 810 may include electronic sensors which provide feedback to an integrated electronic controller.

The header box 820 is configured to be coupled between the heat exchanger and a combustion air inducer of the furnace associated with the pressure sensing device 810. Some components of the header box 820 discussed below are not visible in FIG. 8. The header box is constructed to have at least a portion of blocked condensation protection integrated therein employing channels that fluidly communicate. The header box 820 includes a first channel having a first channel supply port 822 positioned to be in fluid communication with an inlet of a combustion air blower associated with the furnace and a first pressure port 824 couplable to a first input 812 of the pressure sensing device 810. The header box 820 also includes a second channel having a second channel supply port 826 positioned to be in fluid communication with the inlet of the combustion air blower, a second pressure port 828 couplable to a second input 814 of the pressure sensing device 810 and a pressure reference inlet. The second channel is constructed to be in fluid communication with the first channel and configured to have about a same pressure as the first channel when the pressure reference inlet is blocked. The pressure sensing device 810 is configured to turn off a fuel supply to the heat exchanger when determining a pressure differential between the first channel and the second channel is about zero.

Having the pressure differential at or about zero indicates blocked drainage for the header box 820. The header box 820 may be the CEHB 190 as illustrated and discussed above.

Those skilled in the art to which this application relates will appreciate that other and further additions, deletions, substitutions and modifications may be made to the described embodiments.

What is claimed is:

1. A furnace, comprising:
a heat exchanger;
a combustion air inducer configured to generate air flow through said heat exchanger;
a pressure sensing device configured to monitor a combustion pressure through said heat exchanger; and
a header box configured to be coupled between said heat exchanger and said combustion air inducer, said header box comprising:
a negative pressure channel having negative pressure channel supply port positioned to be in fluid communication with an inlet of said combustion air inducer and a negative pressure port couplable to a negative input of said pressure sensing device;
a positive pressure channel having a positive pressure channel supply port positioned to be in fluid communication with said inlet of said combustion air inducer, a positive pressure port couplable to a positive input of said pressure sensing device and a pressure reference inlet, said positive pressure channel in fluid communication with said negative pressure channel and configured to have about a same pressure as said negative pressure channel when said pressure reference inlet is blocked;
wherein said negative pressure channel supply port is adjacent a closed end of said negative pressure channel and said positive pressure port is adjacent a closed end of said positive pressure channel; and
wherein said negative pressure channel supply port and said positive pressure channel supply port are both located entirely within an area of said inlet of said combustion air inducer.

2. The furnace as recited in claim 1, wherein said header box comprises a support collar for coupling said header box to said combustion air inducer, said support collar corresponding to said inlet of said combustion air inducer.

3. The furnace as recited in claim 2, wherein said negative pressure channel supply port and said positive pressure channel supply port are located within a circumference of said support collar.

4. The furnace as recited in claim 1, wherein said positive pressure channel is configured to have a positive pressure compared to said negative pressure channel during operation of said combustion air inducer when said pressure reference inlet is not blocked.

5. The furnace as recited in claim 1, wherein said furnace is a multi-position furnace.

6. The furnace as recited in claim 1 further comprising a first drain and a second drain in fluid communication with said pressure reference inlet and said first and second drains are configured to drain condensation away from said header box.

7. The furnace as recited in claim 1 further comprising:
a first drain and a second drain in fluid communication with said pressure reference inlet; and
wherein said pressure reference inlet is an open end of said positive pressure channel that faces a side of said header box having two drains.

8. The furnace as recited in claim 7, wherein a single one of said two drains is used to drain condensation away from said header box when said furnace is positioned in an upright position.

9. The furnace as recited in claim 1, wherein said pressure sensing device is configured to turn off fuel supply to said heat exchanger when detecting a pressure differential in said negative pressure channel and said positive pressure channel is about zero.

10. The furnace as recited in claim 9, wherein said pressure sensing device is a pressure switch.

11. A blocked condensation protection system for a furnace, comprising:
a pressure sensing device configured to monitor a combustion pressure through a heat exchanger of said furnace; and
a header box configured to be coupled between said heat exchanger and a combustion air blower of said furnace, said header box comprising:
a first channel having a first channel supply port positioned to be in fluid communication with an inlet of a combustion air blower associated with said furnace and a first pressure port couplable to a first input of said pressure sensing device;
a second channel having a second channel supply port positioned to be in fluid communication with said inlet of said combustion air blower, a second pressure port couplable to a second input of said pressure sensing device and a pressure reference inlet, said second channel in fluid communication with said first channel and configured to have about a same pressure as said first channel when said pressure reference inlet is blocked, said pressure sensing device configured to turn off a fuel supply to said heat exchanger when determining a pressure differential between said first channel and said second channel is about zero;
wherein said first channel supply port is adjacent a closed end of said first
wherein said first channel supply port and said second channel supply port are both located entirely within an area of said inlet of said combustion air blower.

12. The blocked condensation protection system of claim 11, wherein said header box comprises a support collar for coupling said header box to said combustion air blower, said support collar corresponding to said inlet of said combustion air blower.

13. The blocked condensation protection system of claim 12, wherein said first channel supply port and said second channel supply port are located within a circumference of said support collar.

14. The blocked condensation protection system of claim 12, wherein said furnace is a multi-position furnace.

15. The blocked condensation protection system of claim 12, wherein pressure sensing device comprises a pressure switch.

16. The blocked condensation protection system of claim 12 further comprising a first drain and a second drain in fluid communication with said pressure reference inlet and said first and second drains are configured to drain condensation away from said header box.

* * * * *

UNITED STATES PATENT AND TRADEMARK OFFICE
CERTIFICATE OF CORRECTION

| | |
|---|---|
| PATENT NO. | : 9,815,154 B2 |
| APPLICATION NO. | : 15/193631 |
| DATED | : November 14, 2017 |
| INVENTOR(S) | : Glenn W. Kowald et al. |

It is certified that error appears in the above-identified patent and that said Letters Patent is hereby corrected as shown below:

In the Claims

Column 12, Lines 7-8, Claim 11    Replace "wherein said first channel supply port is adjacent a closed end of said first" with
-- wherein said first channel supply port is adjacent a closed end of said first channel and said second pressure port is adjacent a closed end of said second channel. --

Signed and Sealed this
Twenty-fourth Day of April, 2018

Andrei Iancu
*Director of the United States Patent and Trademark Office*